US008726673B2

(12) United States Patent
Peters et al.

(10) Patent No.: US 8,726,673 B2
(45) Date of Patent: May 20, 2014

(54) TURBINE ENGINE BYPASS FAN-BLEED NOISE REDUCTION

(75) Inventors: Jeffrey T. Peters, Scottsdale, AZ (US);
Justin C. Mickelsen, Phoenix, AZ (US);
Robert Romano, Tempe, AZ (US);
Matthew D. Greenman, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1125 days.

(21) Appl. No.: 12/685,325

(22) Filed: Jan. 11, 2010

(65) Prior Publication Data

US 2011/0171006 A1      Jul. 14, 2011

(51) Int. Cl.
*F02C 6/08*      (2006.01)

(52) U.S. Cl.
USPC ............. 60/785; 137/15.1; 181/214; 138/109

(58) Field of Classification Search
USPC ........ 60/226.1, 262, 782, 785, 725; 137/15.1;
138/37, 39, 109; 181/210, 211, 214, 181/220

See application file for complete search history.

(56) References Cited

U.S. PATENT DOCUMENTS

| 4,672,807 A * | 6/1987 | Gongwer ................. 60/222 |
| 5,279,109 A | 1/1994 | Liu et al. |
| 7,197,881 B2 | 4/2007 | Winstanley |
| 7,526,921 B2 | 5/2009 | Williams et al. |
| 2009/0094989 A1 * | 4/2009 | Kraft et al. ................. 60/785 |

* cited by examiner

*Primary Examiner* — Andrew Nguyen
(74) *Attorney, Agent, or Firm* — Ingrassia Fisher & Lorenz, P.C.

(57) ABSTRACT

Apparatuses are provided for reducing noise generation from a dead ended conduit in a gas turbine engine. In particular A scooped bellmouth is provided that comprises a bellmouth within a surface having an outer perimeter an inner perimeter and a ramp diverging from the surface at a first end, the ramp extending radially through the outer perimeter of the bellmouth at a second end. The ramp diverts an airflow away from the bellmouth thereby preventing the development of a low pressure area at the bellmouth without affecting the efficiency of the gas turbine engine.

15 Claims, 5 Drawing Sheets

TURBINE ENGINE BYPASS FAN-BLEED NOISE REDUCTION

FIELD OF THE INVENTION

The present invention generally relates to noise reduction on gas turbine equipped aircraft, and more particularly relates to reducing noise generated by fan bypass air flow.

BACKGROUND OF THE INVENTION

Various auxiliary noise sources exist in aircraft. One specific source of noise in aircraft equipped with gas turbine engines is caused by the flow of fan bypass air across the entrances of dead headed conduits leading to the engine fan bleed air system. Fan bypass air is air driven by fan and diverted around the gas generator to provide a significant portion of the engine thrust. Fan bleed air is air that is diverted away from the bypass air for auxiliary uses, such as cooling. The fan bleed air system provides cooling air from the fan bypass air plenum to various parts of the aircraft via a heat exchanger that is often mounted in the engine pylori that secures the engine to the fuselage of the aircraft. When bleed air is not required, a fan air valve mounted in a cooling conduit upstream of the heat exchanger is closed. This creates a Helmholtz Resonator from the stub portion of the conduit located between the fan air valve and the open conduit bellmouth.

The flow of fan bypass air past the entrance creates an area of low pressure at the conduit entrance causing some air to enter the conduit. As air enters the conduit, a pressure buildup occurs in the conduit against the closed fan air valve. When the pressure builds to a certain peak level, the high pressure air in the dead headed conduit reverses direction and exits the conduit resulting in a relatively low pressure level in the conduit due to the inertia of the air exiting the conduit. The repetitive process of pressurizing and depressurizing the dead headed conduit causes a harmonic reverberation similar to that made by a bottle as one blows across the bottle opening. The exact frequency and intensity of the sound will depend on the speed of the fan bypass air through the engine and primarily, the length of the fan bleed air conduit. As a non-limiting example, a model AS907-3-1E gas turbine engine bleed air dead headed conduit produces sound in the 400 Hz range.

Because the generation of noise can create an undesirable nuisance, it is desirable to eliminate the unnecessary noise stemming from the fan bypass air system. In addition, it is desirable to do so with the least number of moving parts which keeps maintenance costs low and reliability high. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A scooped bellmouth serving as the entrance to a conduit is provided. The scooped bellmouth having an outer perimeter, an inner perimeter and a directional ramp. The directional ramp having a first end and a second end and diverges from the surface at the first end. The directional ramp extends radially through the outer perimeter of the bellmouth at the second end in the direction of an airflow along the surface.

A sound reducing device is provided for reducing sound generation within a dead headed conduit. The sound reducing device comprises a bellmouth and a means for diverting airflow away from the bellmouth.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the subject matter herein below is merely exemplary in nature and is not intended to limit the invention or the application and uses of the invention. Furthermore, there is no intention to be bound by any theory presented in the preceding background of the invention or the following detailed description of the invention.

Figure 1:
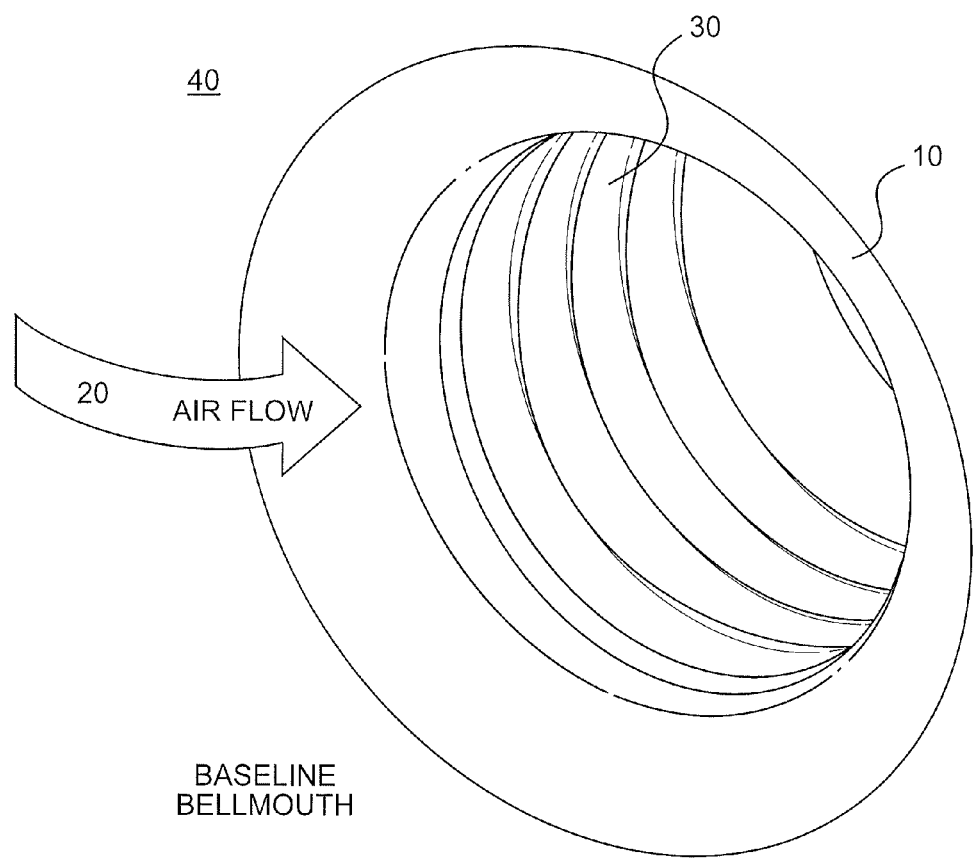
FIG. 1 is an illustration of a conventional bellmouth.

FIG. 1 illustrates a conventional bellmouth entrance 10 for a fan bleed air conduit 30 and is used herein as a baseline for explanatory purposes. To facilitate the flow of fan bypass air 20 into the conventional bleed air conduit 30, the bellmouth entrance 10 is typically designed to be regular, annular and to smoothly recede away into the bleed air conduit in a curvilinear fashion from the surface across which the fan bypass air 20 is flowing toward the bleed air conduit 30.

When the bleed air conduit 30 is closed, a conventional bellmouth entrance 10 typically creates a vortex in the vicinity of the bellmouth as the fan bypass air 20 crosses the bellmouth. This is due to the incongruity the bellmouth entrance 10 causes the fan bypass wall 40. Low pressure gradients that are created by the bleed air conduit 30 at that point. The vortex formation follows Bernoulli's principle that states that for an inviscid flow, an increase in the speed of the fluid occurs simultaneously with a decrease in pressure or a decrease in the fluid's potential energy. As the fan bypass air flow 20 encounters the bellmouth, the incongruity of the fan bypass wall 40 decreases the energy of the fan bypass air flow 20 causing a low pressure gradient in the bleed air conduit 30. The alternating low pressure and high pressures created in the vicinity of the bellmouth entrance 10 creates both the vortex and the unwanted sound.

Figure 2:
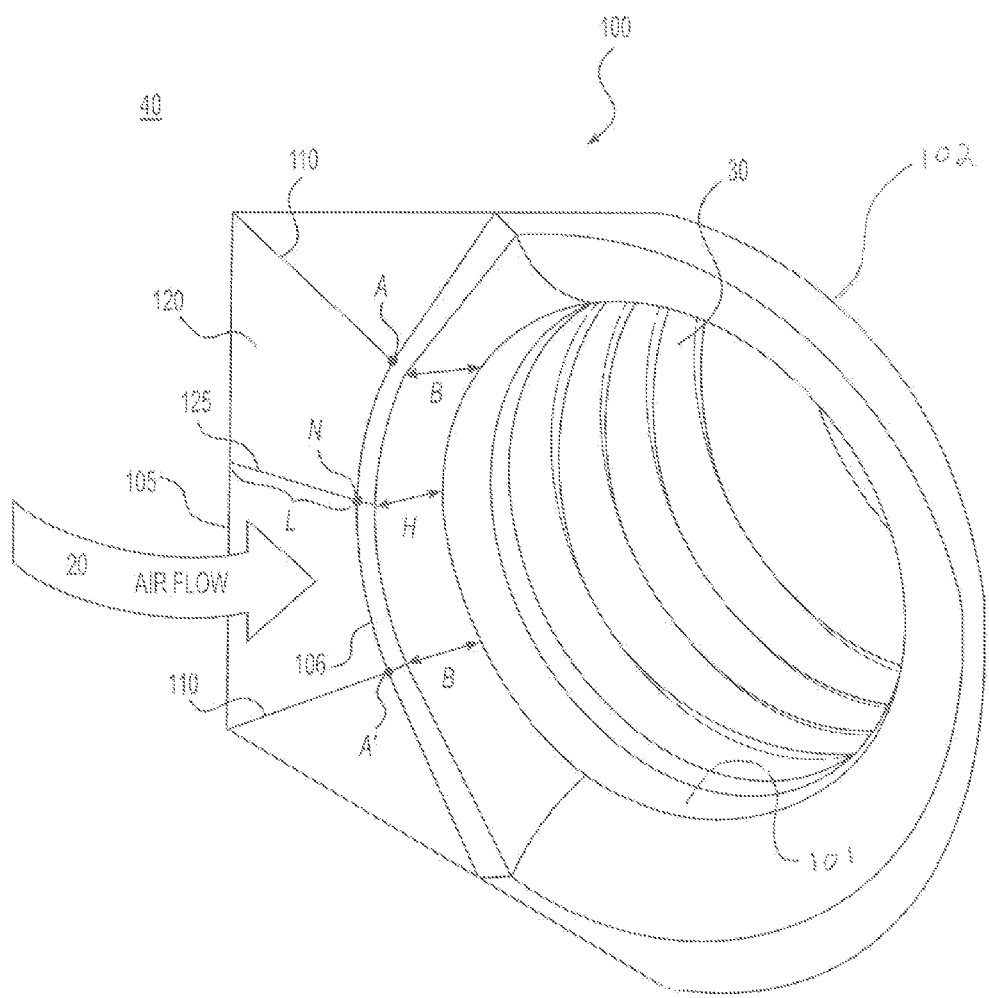
FIG. 2. is an illustration of the scooped bellmouth as disclosed herein below.

FIG. 2 illustrates an exemplary embodiment of the subject matter disclosed herein. The embodiment utilizes a scooped bellmouth 100 to energize and redirect the fan bypass air flow 20 such that a low pressure area does not have the opportunity to form in the vicinity of the bleed air conduit 30. The scooped bellmouth includes an inner perimeter 101 and an outer perimeter 102. The scooped bellmouth 100 also includes a ramp 120 that energizes and redirects fan bypass airflow 20 traveling along the surface of the fan bypass wall 40. The airflow 20 is caused to jump beyond the bleed air conduit 30, thereby preventing the low pressure, low energy influences caused by the existence of the bleed air conduit 30. It should be noted that the actual size of the ramp 120 is designed to avoid creating the low pressure caused by the dead headed conduit 30. At the same time it is designed to also have a negligible effect on the bleed air flow into the conduit 30 when a fan air valve (not shown) is opened allowing bleed air to flow freely into the conduit 30.

The scooped bellmouth 100 may be constructed of any suitable material known in the art. A non-limiting exemplary material may be an epoxy resin, carbon fiber composite material.

The ramp 120 may be of any suitable shape, such as a rectangle. In some embodiments, the ramp 120 may be in the basic shape of an isosceles trapezoid where one or both bases of the trapezoid may be curved concavely to track the curve of the fan bypass wall 40. The major base 105 of the trapezoid joins and is flush with the fan bypass wall 40 through which the bleed air conduit 30 penetrates. The minor base 106 is elevated above the fan bypass wall 40 by a height (H) and may also be curved concavely with resulting apexes A and A' (also referred to herein as "bumps") at either end of the minor base. The height of the minor base H is also referred to herein as the "scoop depth".

The scoop depth H at the scoop nadir N is equal to:

$$\sin \alpha \cdot L,$$

where the angle $\alpha$ is the "scoop angle" above the fan bypass wall 40 and L is equal to the length of the ramp 120 from its point of divergence D at the fan bypass wall 40 to the nadir N of the curved minor base. As a non-limiting example, for the model AS907-3-1E gas turbine engine with a four inch bleed air conduit 30, the scoop depth H may range from 0.01 to 0.18 inches with a nominal value of 0.12 inches. The scoop angle $\alpha$ may range between 0° and 45° with a nominal value in some embodiments of approximately 5°.

The bumps A and A' may be situated in space above and down stream from a nadir N of the curved minor base located at the centerline 125 of the ramp 120 and equidistant between bumps A and A'. The curvature of the minor base 106 may simply be the same curvature of the fan bypass wall 40. In this case the radial height of the nadir N above the fan bypass wall 40 may be the same as the radial height of the bumps A and A' above the fan bypass wall 40. The radial height of the bumps A and A' is referred to herein as the bump depth B.

In other embodiments, the radial height of bump depth B above the surface of the fan bypass wall 40 may or may not be greater than the scoop depth H. As a non-limiting example, a Honeywell AS907-3-1E model gas turbine engine (found on the Embraer Legacy 500 aircraft) with a four inch bleed air conduit 30 may use a bump depth B in the range of 0.005 to 0.12 inches with a nominal value of 0.065 inches or approximately 0.52 times the scoop depth H. However, one of ordinary skill in the art will recognize that the specific bump depth B will depend on the nominal operating velocity of the fan bypass air flow 20 of a particular engine and the size of the bleed air conduit 30 integrated therein. The bump depth B may be set independently from that of the scoop depth H at nadir N.

The length of the ramp L may be any suitable length. In some embodiments the length of the ramp L may be 1.2 inches. However, one of ordinary skill in the art will recognize that the specific dimensions of the ramp 120 will depend on the nominal operating velocity of the bypass air flow of a particular engine and the size of the bleed air conduit 30 contained therein. The nominal velocity for the Fan Bypass Airflow 20 in the AS907-3-1E gas turbine engine ranges between Mach 0.4 and Mach 0.5

Figure 3:
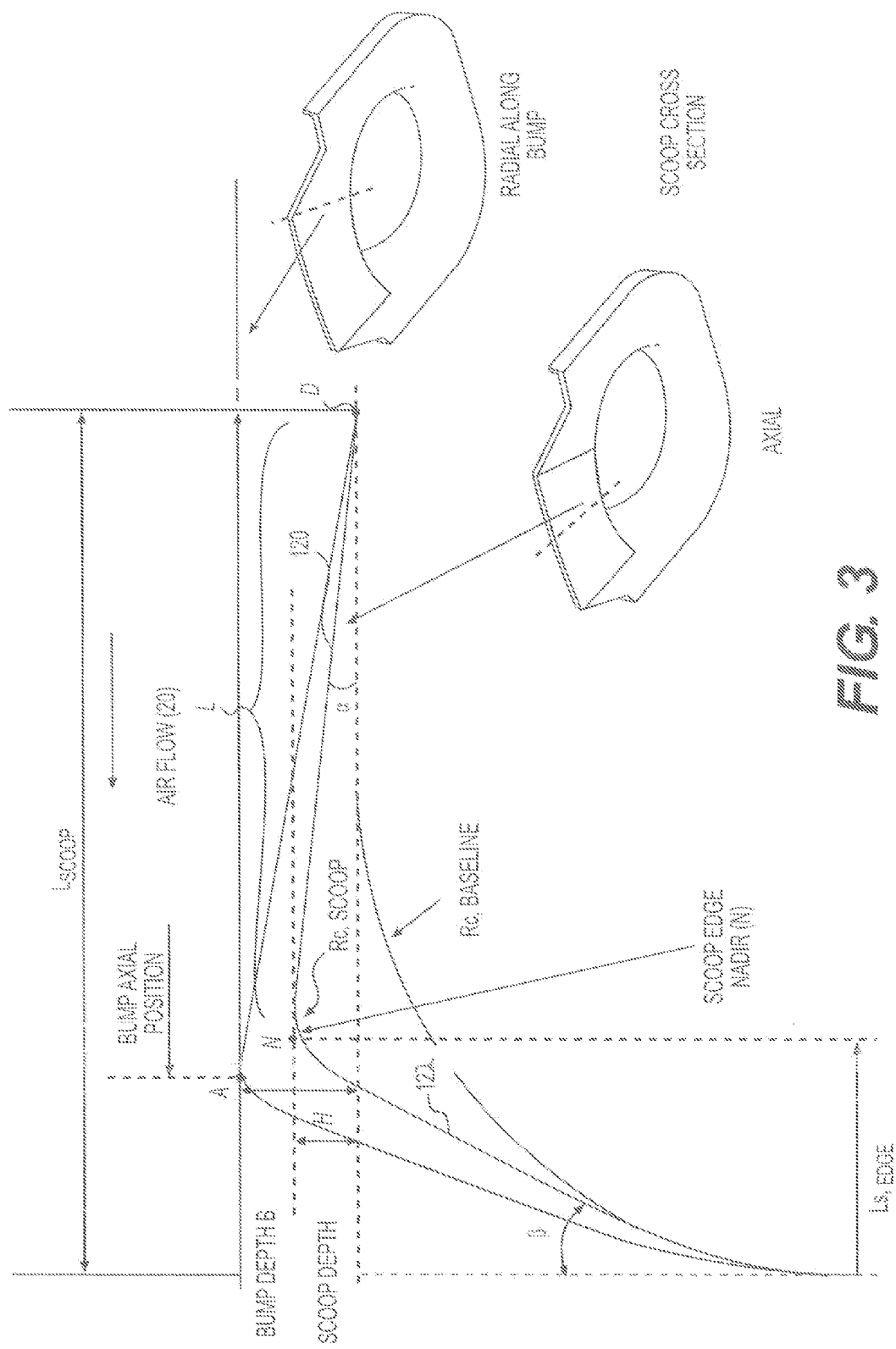
FIG. 3 is a curvature profile of a conventional bellmouth as compared to an exemplary profile of the scooped bellmouth disclosed herein.

FIG. 3 is a curvature profile of a conventional bellmouth entrance 10 of FIG. 1 as superimposed against an exemplary curvature profile of the scooped bellmouth 100 of FIG. 2. The ramp 120 plus the downstream ramp 122 may be referred to as the "scoop." The total axial length of the scoop 120/122 from the divergence point D to the diameter of the bleed air conduit 30 may similarly be referred to as the scoop length ($L_{scoop}$).

The curvature profile further illustrates the various features of the scooped bellmouth 100 described herein. In particular, FIG. 3 illustrates the downstream ramp angle $\beta$, which is defined as the angle between a line tangent to the radius of curvature of the baseline conventional bellmouth entrance 10 ($R_{c,baseline}$) and a line extending from the diameter of the bleed air conduit 30. The downstream ramp angle $\beta$ may range from 0° to 90°, with some embodiments utilizing a nominal downstream ramp angle of approximately 26°. The $R_{c,baseline}$ may range from 0.12 to 0.3 times the diameter of the bleed air conduit 30.

The downstream ramp 122 intersects the ramp 120 with a radius of curvature of the scoop ($R_{c,scoop}$) at the intersection. The radius of curvature of the scoop ($R_{c,scoop}$) may range between 0.005 to 0.05 times the diameter of the bleed air conduit 30 and may have a nominal value of 0.03125 times the diameter of the bleed air conduit 30. The axial length ($L_{s,edge}$) of the downstream ramp 122 is equal to:

$$R_{c,baseline} \cdot \tan(\beta).$$

Figure 4:
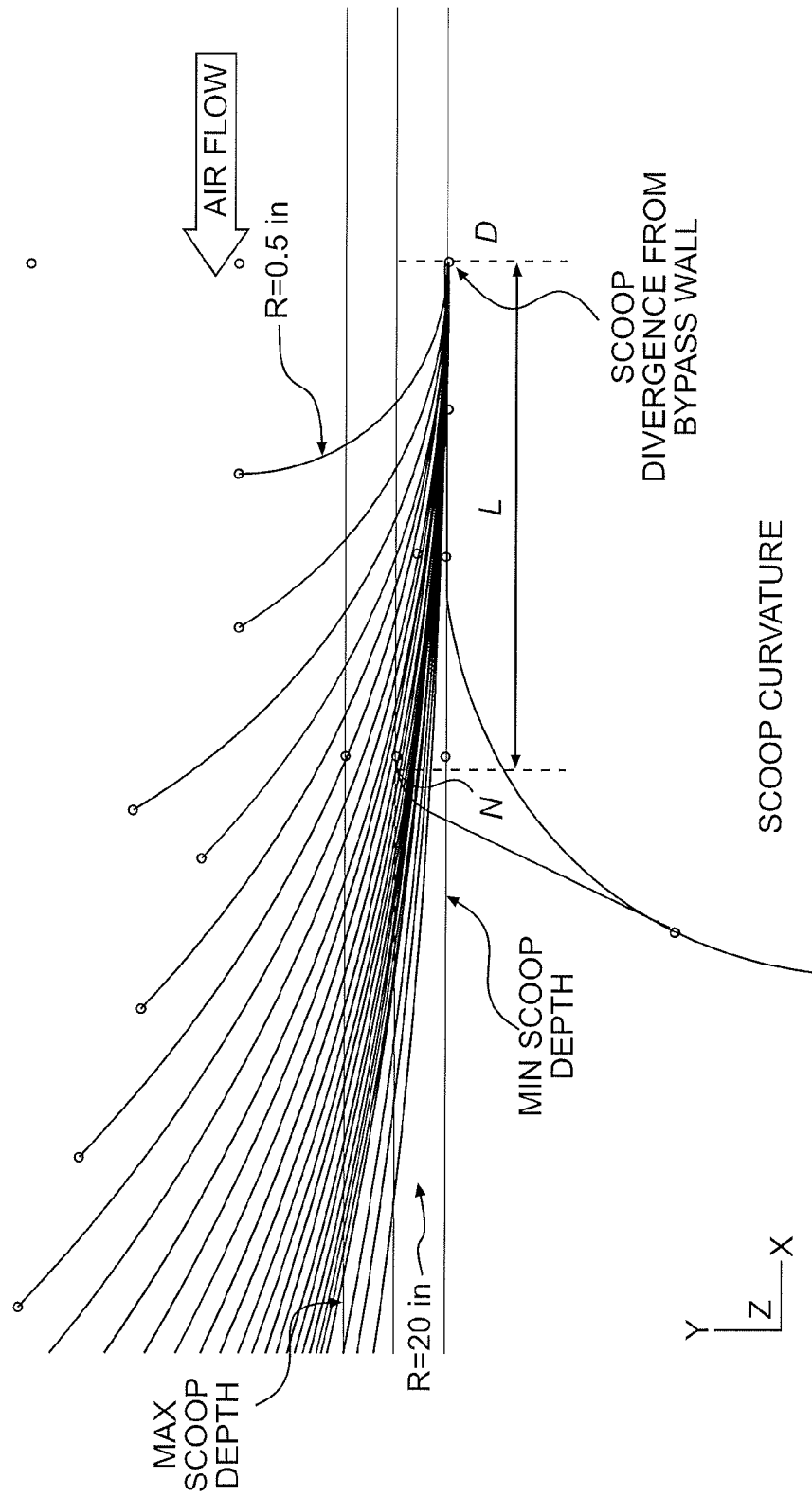
FIG. 4 is a graph showing the curvature profile of FIG. 3 and superimposing on the curvature profiles a set of radius curves which may be used to define the height of the scoop nadir.

FIG. 4 is a graph showing the curvature profile of the conventional bellmouth entrance 10 of FIG. 1 as compared to an exemplary profile of the scooped bellmouth 100 of FIG. 2. Superimposed on the curvature profiles is a set of radius curves in inches, which may be used to define the height of the scoop nadir N. Each curve represents a partial circumference of a circle with a radius R. The radius R is tangent to the point D on the major base where the ramp 120 diverges from the fan bypass wall 40. In some embodiments, the ramp 120 may have a longitudinal curvature correlated with the radius R. In other embodiments, the ramp 120 may be absolutely straight.

Given a particular gas turbine engine and the operational velocity of the fan bypass air flow 20 through that engine, a desired trajectory of the fan bypass airflow 20 that impedes the formation of the low pressure vortex in the vicinity of the bleed air conduit 30 can be determined. The chosen radius R and the ramp length L may then define the scoop depth H and the scoop angle $\alpha$. As non-limiting examples, one of ordinary skill in the art will appreciate that at a radius R of 20 inches and a ramp length of 1.2 inches, the scoop angle $\alpha$ may be 5.5°. As such, the scoop depth H would be 0.115 inches.

Figure 5:
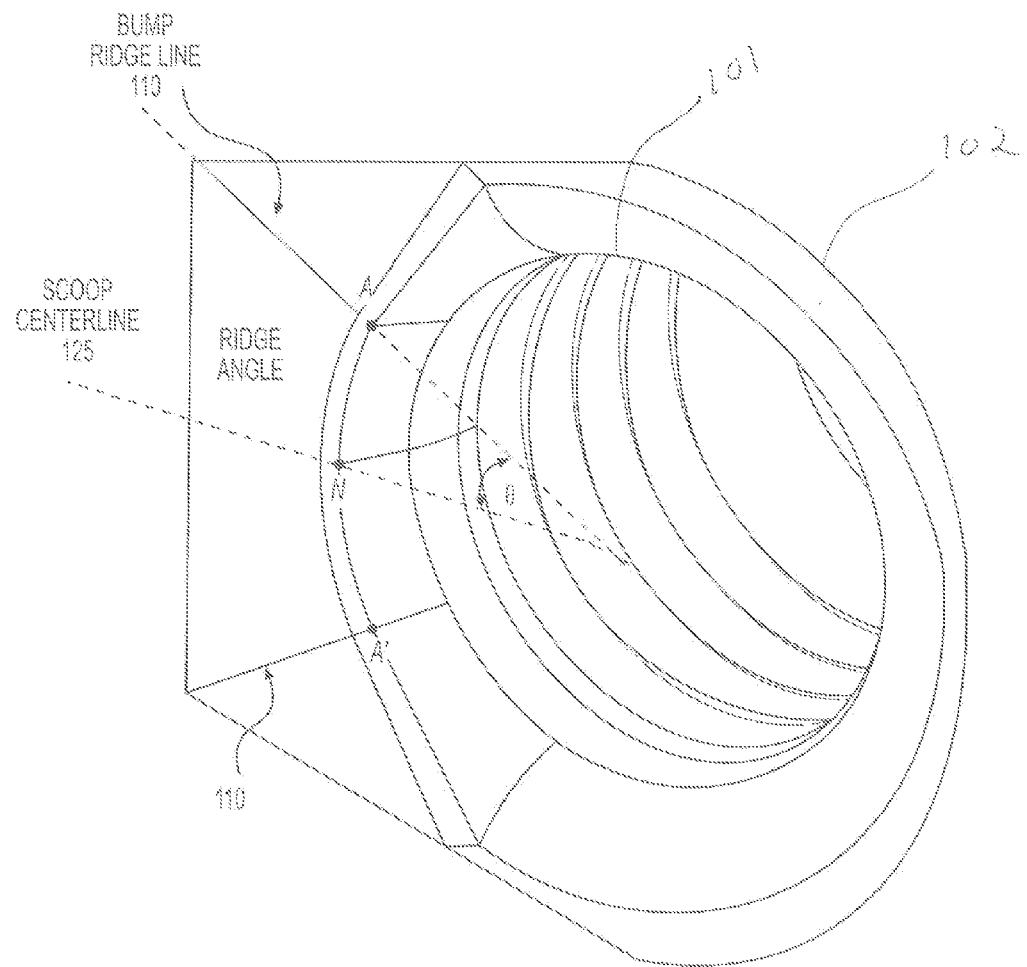
FIG. 5 is an illustration of the scooped bellmouth highlighting a ridge angle.

FIG. 5 illustrates the ridge angle $\theta$ of the scooped bellmouth 100. The ridge angle $\theta$ may be a function of the diameter of the bleed air conduit 30, and is equal to:

$$\mathrm{Tan}^{-1}(\tfrac{1}{2} \cdot W_{scoop}/L_{scoop}),$$

where $W_{scoop}$ is the width of the ramp 120, which may range from 0.1 to 2 times the diameter of the bleed air conduit 30 and $L_{scoop}$ is the total axial length of the scoop 120/122 from the divergence point D to the diameter of the bleed air conduit 30. The ridge angle $\theta$ may be a predetermined angle for a given engine model. As a non-limiting example, the ridge angle for a model AS907-3-1E gas turbine engine may be set at 30°. As such, the ridge angle determines the distance between the bumps A and A', which is the length of the minor base of the ramp 120.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A scooped bellmouth, comprising:
   a bellmouth within a surface, the bellmouth having an outer perimeter and an inner perimeter; and
   a directional ramp in the shape of an isosceles trapezoid having a major base which is a first end and a minor base which is a second end, the ramp diverging from the surface at the first end, the directional ramp extending radially through the outer perimeter of the bellmouth at the second end in the direction of an airflow along the surface, wherein the ends of the minor base are located inside, on, or not materially outside the outer perimeter.

2. The scooped bellmouth of claim 1, wherein the major base is the first end and has a first curvature that matches the curvature of the surface from which it diverges.

3. The scooped bellmouth of claim 2, wherein the minor base is the second end and has a second curvature defined by a nadir and an apex at each end of the minor base.

4. The scooped bellmouth of claim 3, wherein the second curvature is different from the first curvature.

5. The scooped bellmouth of claim 4, wherein the nadir N of the second end is elevated above the first end by a height.

6. The scooped bellmouth of claim 5, wherein the height is equal to the sine of an angle between the surface and the directional ramp at the first end multiplied by a length of the directional ramp from the major base to the nadir.

7. The scooped bellmouth of claim 6, wherein the angle has been predetermined to divert an airflow traveling at a particular speed along the directional ramp over the bellmouth to a point on the surface beyond the outer perimeter of the bellmouth.

8. The scooped bellmouth of claim 3, wherein a height of the apexes has a height that is lower than the height of the nadir relative to the surface.

9. The scooped bellmouth of claim 7, wherein the surface is an inside surface of a tube.

10. The scooped bellmouth of claim 7, wherein the surface is a substantially flat surface.

11. The scooped bellmouth of claim 1, wherein the directional ramp is integral to the bellmouth.

12. The scooped bellmouth of claim 1, wherein the directional ramp is fixedly attached to the surface and is abutting the bellmouth.

13. A scooped bellmouth, comprising:
    a bellmouth within a surface, the bellmouth having an outer perimeter and an inner perimeter; and
    a ramp in the shape of an isosceles trapezoid with a major base having a first curvature that matches the curvature of the surface from which it diverges and a minor base having a second curvature defined by a nadir and an apex at each end of the minor base, the ramp diverging from the surface at the major base and extending radially through the outer perimeter of the bellmouth at the minor base and in the direction of an airflow along the surface, wherein the ends of the minor base are located inside, on, or not materially outside the outer perimeter.

14. The scooped bellmouth of claim 13, wherein a height of the apexes has a height that is one of equal to and lower than the height of the nadir relative to the surface.

15. The scooped bellmouth of claim 13, wherein a height of the apexes has a height that is one of equal to and higher than the height of the nadir relative to the surface.

* * * * *